United States Patent [19]
Gobbo et al.

[11] Patent Number: 5,529,796
[45] Date of Patent: Jun. 25, 1996

[54] PROCESS FOR MANUFACTURING COLD WATER SOLUBLE AND CHILL STABLE READY TO DRINK TEA AND PRODUCT

[75] Inventors: Steven A. Gobbo, Secaucus; John W. Tobin, Hillsdale; Douglas A. Balantine, West Milford, all of N.J.

[73] Assignee: Thomas J. Lipton Co., Division of Conopco, Inc., Englewood Cliffs, N.J.

[21] Appl. No.: 436,838

[22] Filed: May 8, 1995

Related U.S. Application Data

[63] Continuation of Ser. No. 124,895, Sep. 22, 1993, abandoned, which is a continuation-in-part of Ser. No. 994,805, Dec. 22, 1992, abandoned.

[51] Int. Cl.⁶ .................................. A23F 3/18; A23F 3/30
[52] U.S. Cl. .................................. 426/330.3; 426/597
[58] Field of Search .................................. 426/597, 330.3

[56] References Cited

U.S. PATENT DOCUMENTS

| | | |
|---|---|---|
| 2,476,072 | 7/1949 | Tressler .................................. 426/597 |
| 2,963,368 | 12/1960 | Greenbaum .................................. 426/597 X |
| 3,666,484 | 5/1972 | Gurkin et al. . |
| 4,051,267 | 9/1977 | Jongeling . |
| 4,076,847 | 2/1978 | Johnson et al. . |
| 4,748,033 | 5/1988 | Syfert et al. .................................. 426/597 X |
| 4,797,293 | 1/1989 | Evans et al. .................................. 426/597 X |
| 4,946,701 | 8/1990 | Tsai et al. . |

FOREIGN PATENT DOCUMENTS

| | | | |
|---|---|---|---|
| 0209937 | 1/1987 | European Pat. Off. .................................. 426/597 |
| 62-228227 | 10/1987 | Japan .................................. 426/597 |
| 7510935 | 9/1974 | Netherlands .................................. 426/597 |
| 1319439 | 6/1973 | United Kingdom .................................. 426/597 |

OTHER PUBLICATIONS

JPO Abstracts, Abstracting JP62-228227 (Oct. 7, 1987).
Punnett, What Causes Clouding In Iced Tea, Tea and Coffee Trade Journal, May 1956, pp. 17, 86, 87.

*Primary Examiner*—Anthony J. Weier
*Attorney, Agent, or Firm*—James J. Farrell

[57] ABSTRACT

Tea products as well as a process for their preparation are described. They are prepared by adding high methoxy pectin to an acidified tea extract obtained from low temperature extraction.

19 Claims, 1 Drawing Sheet

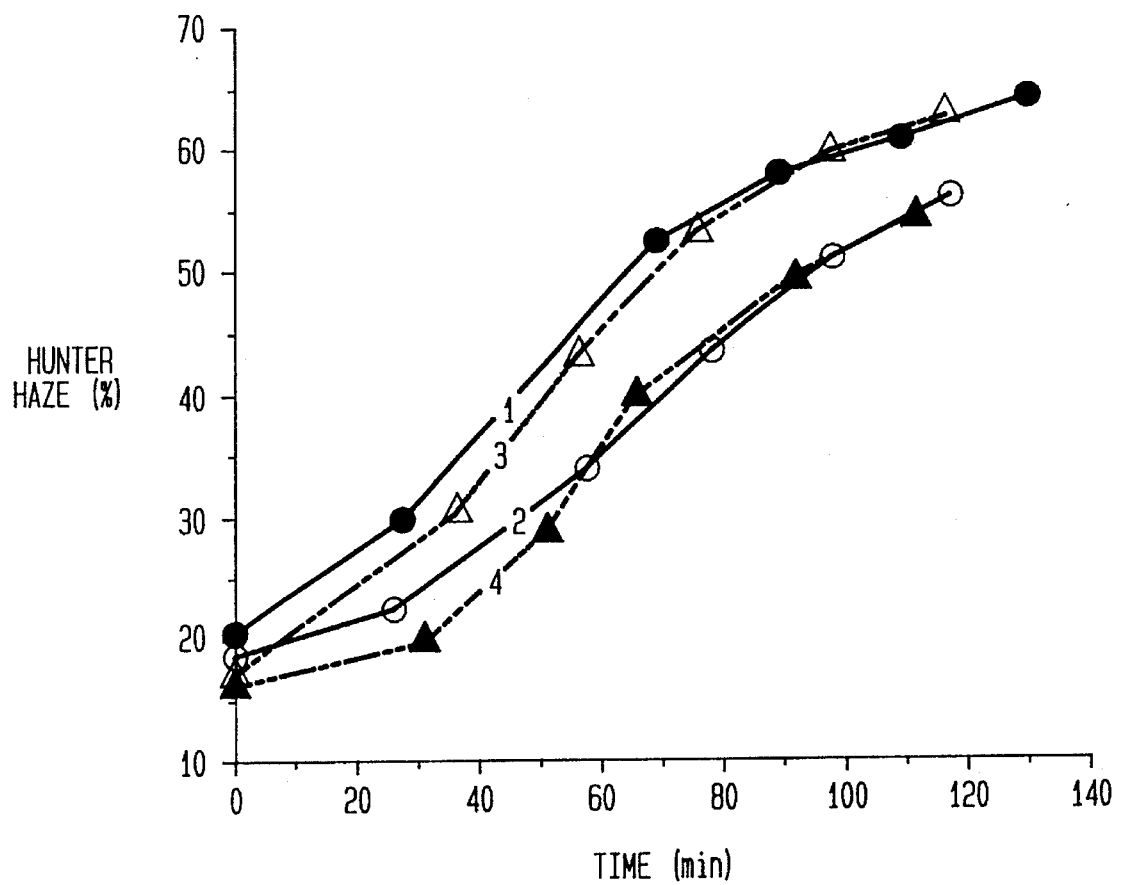

PROCESS FOR MANUFACTURING COLD WATER SOLUBLE AND CHILL STABLE READY TO DRINK TEA AND PRODUCT

This is a continuation, application of Ser. No. 08/124,895, filed Sep. 22, 1993, which is a continuation in part of Ser. No. 07/994,805 filed Dec. 22, 1992, both of which are now abandoned.

This invention generally relates to a process for manufacturing a "crystal clear" cold water soluble, chill stable, and acid stable ready-to-drink tea, as well as to the product produced thereby.

BACKGROUND OF THE INVENTION

The production of ready-to-drink iced tea beverages which are crystal clear, cold water soluble and stable when the formulation is acidified for balanced fruit flavors and/or microbiological stability has been difficult to achieve, when using either fresh brewed tea solids or instantized tea ingredients. When all natural, real brewed tea based products are to be produced, preparation of clear beverages is especially difficult due to tea cream formation and acid instability. This is especially evident when the preferred black teas are employed.

Japanese patent application No. 61-68186 filed Mar. 27, 1986 employs a hot water decoction of black tea to which a selected amount of a solution of high methoxy pectin is added. The combination is acidified with citric acid to about pH 3 and observed for turbidity. The mixture is said to remain with no turbidity for about one month.

The use of high methoxy pectin to stabilize acidified milk drinks is discussed in several product brochures by Hercules and by Copenhagen Pectin A/S.

Cold extraction of vegetable matter is disclosed in German patent application DE 3203100A1 disclosure date Aug. 4, 1983 and Canadian patent 927664.

A cloud system for beverage mixes containing methoxy pectin is disclosed in U.S. Pat. No. 4,529,613.

JP 4,045,774 discloses ultrafiltration of green tea to preserve it by removing high molecular weight components one of which is pectin.

GB 1,294,543 discloses addition of pectin isolated from tea leaf to tea extracts prior to spray drying, for control of powder density.

SUMMARY OF THE INVENTION

Preparation of instant teas is well known in the art and generally involves extraction of tea through inumerable well known processes. The extract may then be treated enzymatically or chemically to render it soluble in cold water and to, in some cases, develop desirable color. The extract is also preferably clarified by known means such as filtration or centrifugation. The extract is then concentrated and dried preferably to a level of 5% moisture or less again by-means known to the art. Preparation of tea solids for subsequent dissolution is disclosed in, for example, GB patent 2,208,096A and U.S. Pat. No. 3,666,484 both of which are incorporated by reference herein.

In one embodiment of this invention such powdered instant teas are substantially dissolved in water to form tea solutions which are then treated according to the processes of the invention with high methoxy pectin.

Another embodiment of the invention also involves the extraction of tea or blends of tea, preferably low creaming black teas at temperatures of less than 180° F. using a preferred water to leaf ratio of 4:1 to 30:1 preferably in a fixed or static bed extractor. The tea extract, which can be black, green, oolong or mixtures of these is used to formulate a "ready to drink" tea beverage at pH 4.5 or below. The amount of tea extract used to formulate the beverage is regulated to provide a concentration of tea solids in the beverage of 0.3% or less. Sweeteners, acids and other flavors can be added to achieve beverages with desired flavor characteristics.

High methoxy citrus pectin according to the invention is added at a beverage concentration of 50–500 ppm to impart improved flavor and product acid stability.

In one aspect, the unique combination of low temperature extraction of low creaming teas in a fixed bed extractor to create a tea extract free from leaf fines, the use of this extract to deliver tea solids to a beverage at 0.3% or less and the addition of the selected pectin results in the preparation of an all-natural brewed tea based ready-to-drink products. The product, produced using this process, whether instant tea or fresh brewed tea extract is employed, can be packaged into cans, bottles or boxed drink packets by thermal processing or by the use of preservatives for microbiological stability. These products remain substantially crystal clear and free from sedimentation when stored under refrigerated or ambient temperatures for at least 4 to 6 months. In addition, the product prepared using this inventive process is significantly preferred in taste when tested using research panels.

BRIEF DESCRIPTION OF THE DRAWING

The drawing represents a graph of the values reported in Example 4. This is a comparison of the haze developed by each of the runs 1 through 4 over a relatively short period of time.

DETAILED DESCRIPTION OF THE INVENTION

Instant teas prepared by methods well known to those skilled in the art can be used to advantage with the process of the invention. Most instant teas when used to create acidified ready-to-drink beverage develop haze and floc upon storage.

Black teas, particularly those selected to have a low cream index and which produce highly colored infusions are essentially preferred for the process but, of course, Green and Oolong teas may also be employed if appropriate care is taken.

Preferably, black tea with the above characteristics is extracted with water at a temperature of about 60° F. to 180° F. at water to leaf ratios of from about 4:1 to 30:1. Higher or lower water to leaf ratios could be employed but are impractical. It is preferred to extract the tea at about 90° F. at a water to leaf ratio of 10:1.

The extraction process is conducted in a vessel such as a column where tea leaf remains static or fixed as a bed of from 6 inches to 20 inches, but most preferably 14–15 inches. Extraction of the tea leaves in such a static bed allows for good yield of tea solids and the resulting extract is substantially free of insoluble materials. Extraction of the tea as a loose leaf in agitated extractors such as a kettle or in continuous extractors can also produce extracts of the desired chemical composition and flavor for producing the desired low creaming ready-to-drink beverage but require additional processing through equipment such as centrifuges or filters to remove leaf fines. Extraction of the tea at low temperature selectively removes desirable tea flavor components, color, and results in a polyphenol profile which will not form tea cream when formulated into beverages at a tea solids level of 0.3% or less. When black teas which are high cream formers are extracted at low temperature, or black teas are extracted at elevated temperatures, these teas will form cream in beverage formulations unless the cream is removed or the tea is treated using chemicals or enzymes. These steps are costly and result in loss of tea flavor.

Preparation of tea beverages either instant or fresh brewed with fruit flavors requires acidification to a pH of 2.5–4.5 to result in formulations with a desirable flavor balance. Fruit flavored beverages prepared from either brewed tea solids or instant tea solids when rendered cold water soluble by methods known to those skilled in the art can be initially clear, especially if the extraction process described above is followed, but gradually develop haze. Sedimentation of solids from these beverages occurs after storage for periods of time ranging form as short as a week to as long as 6–12 weeks. The haze and sediment which forms is not typical tea cream but rather is an insoluble complex which forms as a result of exposure to acidic conditions below about pH 4.5. The formation of this insoluble complex, which results in floc and haze is accelerated by elevated storage temperatures (120° F.) and is retarded by refrigerated storage. This insoluble complex is different from tea cream which is chiefly composed of caffeine and the tea polyphenols, theaflavins and thearubigens. This complex is low in caffeine and contains high molecular weight materials of 1000 daltons or more. The floc and haze resulting from this complex can be solubilized by raising the pH of the solution above about 4.5 but rapidly returns when the beverage is acidified below about pH 4.5. It has been found that the addition of high methoxy citrus pectin at concentrations from about 50 ppm to 500 ppm on a beverage basis preferably 100 to 300 ppm will significantly reduce the development of haze and prevents sedimentation of material from beverages in the pH range of 2.5 to 4.5. Beverages prepared using either the instant tea or the tea extract from the process described above will remain crystal clear and sediment free when formulated at pH 4.5 and below. It has also been found that the addition of citrus pectin to tea beverage formulations significantly improves the acceptability of the product when evaluated for flavor using research test panels.

In practice the acidified tea beverages can be stabilized by the addition of 50–500 ppm of high methoxy pectin such as citrus, apple or tea pectin on a beverage basis. Higher levels of pectin can be employed but induce changes as flavor and beverage acceptability. The citrus pectin for example is solubilized in water and can be added to the tea solution prior to acidification or following addition of flavoring components and acid. It is preferred to add the pectin prior to acidification to provide the maximum benefit of the pectin. The pectin could also be dry blended with the tea leaves and rendered soluble during the extraction process. The resulting beverage can be packaged and preserved by the addition of antimicrobial agents such as sodium benzoate and sorbic acid or by thermal processing.

The pectin employed is preferably a high methoxy pectin. Pectin is a hydrocolloid consisting mainly of partial methyl esters of polygalacturonic acid. The acid groups are partly neutralized by ammonium, calcium, potassium and sodium ions. Typically, it is obtained by aqueous extraction of plant materials such as citrus fruit and applies. Full descriptions of pectins and high methoxy pectins are contained in *Polysaccharides in Food* by Blanshard et al. (1979) Butterworth Publishers, pages 185 to 193. The distinction between high methoxy pectin and low methoxy pectin is set out on page 192 and generally depends on the degree of esterification. High methoxy pectin being about 50% to 80% esterified, low, methoxy pectin being about 25% or less.

The main structural feature of pectin is a linear chain of 1,4-linked α-D-glacturonic acid units, although almost all pectins contain a number of neutral sugars such as L-rhamnose, D-galactose and L-arabinose. Normally some of the glacturonic acid carboxyl groups are esterified with methyl alcohol. A methoxyl content of about 14% is theoretically possible with 100% esterification. However, this is never achieved and most high methoxyl pectins have 50–80% of the theoretical carboxyl groups esterified. By removing methoxyl groups to a degree of esterification (DE) less than 50% (<7% methoxyl), a change in functional behavior is obtained that makes these low methoxyl pectins behave like a completely new family of polymers, more closely related to alginates than to pectins.

Pectins can form two types of gels depending upon their degree of esterification. Regular high methoxyl pectins will form gels at acid pHs and in the presence of a high concentration of sugar. Low methoxyl pectins are similar to alginates in gelling properties, and require a divalent cation such as calcium, in order to gel. These gels can be formed without sugar and over a wide pH range. Low methoxyl pectins have DEs in the 20–40 range, but the gelling behavior of LM pectins depends not only on the DE but also on the de-esterification method used.

Pectin and Low Methoxyl Pectin are also described in Food Carbohydrates by Lineback (AVI Publishing Co. 1982) pp. 283 and 284 substantially as above.

The type of pectin preferably used is a high methoxy pectin such as GENU JMJ pectin a registered trademark of Hercules Inc. The pectin is disclosed as a stabilizing agent for acidified acid fermented milk drinks. This type of pectin contains small quantities of sugar to standardize gel strength or viscosity. GENU JMJ is typically used as a stabilizing agent in acidified milk drinks. It has a stabilizing power of 130±5 grade SAM and a pH in a 1% solution of deionized water of about 3.60 to 4.40. The degree of esterification is typically about 72%. It is completely soluble in deionized water at 60° C. with agitation. It is a free flowing, non-caking granulate with a particle size such that less than 1% pectin is left or a 0.250 mm test sieve. Additionally, GENU VIS pectin which is also a registered trademark of Hercules Inc. is operable.

The GENU VIS pectin has a degree off esterification of typically about 70%, is completely soluble in deionized water at 60° C. with agitation and has a particle size of less than 1% retained on a 0.250 mm test sieve. The viscosity of a 4% solution is about 400 to 500 pH and a 1% solution in deionized water has a pH of about 2.90–3.40. This type of pectin is typically extracted from citrus peel an preferably all natural. The GENU VIS has been used to impart viscosity and mouthfeel to beverages, for example, diet soft drinks, fruit drinks, barbecue and other sauces and frostings.

All parts, percentages and proportions contained herein are by weight unless otherwise specified.

EXAMPLE 1

Fresh brewed extracts of black tea were prepared by extraction of 800 pounds of low creaming black tea blend.

The tea was filled into a cylindrical column extractor 6 feet in diameter by 4 feet in height. The bed of tea when filled into the extractor had a height of 15 inches. Water at 90° F. was sprayed onto the surface of the bed of tea until 1152 gallons of water had been added. The resulting brewed tea extract was used to prepare a syrup from which ready-to-drink beverages would be prepared. The beverage syrup was formulated by adding 2365 gallons of high fructose corn sweetener to 10952 pounds of black tea extract followed by the addition of a lemon flavor system and 450 pounds of citric acid. Water was added to adjust the final volume to 4500 gallons. Purified water was added to 916.7 gallons of syrup to a final volume of 5500 gallons under constant agitation and the resulting single strength beverage was hot packed into 16 ounce glass bottles at 190° F. This product was used a s control product.

A product containing 150 ppm citrus pectin was prepared in a similar manner. To 916.7 gallons of beverage syrup 4533.3 gallons of purified water was added under agitation. 7.1 pounds of high methoxy citrus pectin was slowly added to 50 gallons of water at 100° F. in a liquefier and allowed to mix for 10 minutes to completely solubilize the pectin. The pectin solution was added to the diluted beverage syrup to produce single strength beverage containing 150 ppm pectin. The beverage was hot filled into 16 ounce bottles at 190° F. The control product and pectin containing products were both crystal clear when initially produced with haze values as measured using a Hunger Spectrophotometer of 16.42 and 14.54; respectively.

The products were placed in storage under refrigerated (40° F.), ambient (70° F.), and accelerated (91° F.) conditions and in a water bath at 120° F.

Results:

The following table shows the Hunter Color haze values of the ready-to-drink beverages as a function of storage time and condition.

TABLE 1

EFFECT OF CITRUS PECTIN ON HUNTER HAZE VALUES AS A FUNCTION OF STORAGE TEMPERATURE AND TIME

| WEEKS | 40° | | 70° F. | | 91° F. | |
| --- | --- | --- | --- | --- | --- | --- |
| | CONTROL | PECTIN | CONTROL | PECTIN | CONTROL | PECTIN |
| 0 | 16.54 | 16.42 | 16.54 | 16.42 | 16.54 | 16.42 |
| 2 | 33.66 | 23.58 | 23.16 | 12.83 | 29.31 | 15.06 |
| 4 | 42.30 | 21.88 | 40.86 | 19.30 | 56.88 | 21.22 |
| 6 | 45.54 | 32.40 | 41.62 | 22.90 | 69.74 | 26.72 |
| 13 | 50.73 | 22.04 | 68.87 | 24.94 | 81.44 | 31.84 |

The high clarity of both the control and pectin containing samples at time zero demonstrates the effectiveness of the extraction process for production of a brewed tea product which is free from cream and leaf fines. Storage of the samples at 120° F. results in rapid development of haze and sedimentation in the control. Visual observations after one week storage at this temperature showed significant differences between the samples. The control sample without pectin was very cloudy and contained precipitate while the sample containing 150 ppm citrus pectin was clear and sediment free. The haze data in Table 1 clearly shows the effectiveness of 150 ppm pectin on maintaining product clarity for as long as 13 weeks under all storage conditions. The acceptable clarity of the control product under refrigerated storage for a long as 4 weeks demonstrates the value of the critical extraction parameters which include a low creaming blend at 90° F. in a fixed bed extraction system. The development of haze and floc in these beverage systems when pectin is not added is particularly evident in the samples stored under accelerated conditions. The fact that all of the pectin samples, including 13 weeks have Haze values of less than 35 and are sediment free is very significant.

EXAMPLE 2

Product prepared as described in Example 1 and stored ambient for 6 weeks were evaluated by a sensory panel to define product acceptability ratings. The two variables evaluated were the control formula and the formula containing 150 ppm added citrus pectin, and respondents tasted the samples sequentially, rated them hedonically and described "Likes" and "Dislikes." Secondly, a preference question was asked along with rating for three attributes on each sample. The attribute ratings were: amount of tea flavor, lemon taste and overall balance.

Acceptability differences were detected (p=0.01). The sample with pectin was rated higher than the control with no pectin.

Results:

Acceptability differences between samples were detected (p-0.01). The sample with pectin was rated higher than the control.

TABLE 1

CLT1279-READY TO DRINK TEA
MEAN RATINGS
(9 Point Hedonic Scale)
(N = 84)

| SAMPLE | MEAN RATING |
| --- | --- |
| Control (no Pectin) | 6.36a |
| With Pectin | 6.85b |

Means with different letters are significantly different.

When the attribute ratings were evaluated the Ready-To-Drink Tea containing pectin was described to have more overall tea flavor and a tea flavor balance of being just about right.

EXAMPLE 3

The effect of pectin (GENU JMJ) from Hercules Inc. on the stability of an instant tea based ready-to-drink beverage was evaluated. The particular sample of instant tea used for the test was one which would make an unacceptable product due to the rapid development of floc after incorporation into a typical low pH beverage formulation. This instant tea also fails when tested for acid stability in a standard Floc Test Supplemental ATP.

Four ready-to-drink formulations were prepared according to the following formula with the level of pectin addition as the experimental variable:

| 1) Water | 2000 cc |
| --- | --- |
| 2) Instant Tea | 3.9 grams |
| 3) Flavor Premix | 241.4 grams |
| 4) Pectin JMJ | 0.0%, 0.014%, 0.018% and 0.028% |

The samples were prepared by dissolving the appropriate amount of citrus pectin into the water until fully dissolved. The tea was added until solubilized and the flavor premix was added last. The flavor premix was comprised of flowing material in sufficient citric acid to form a beverage with a pH of about 3.0. The beverage preparations were hot packed and placed in storage for evaluation.

The samples were evaluated visually and by Hunter Colorimetry after 2 months storage. Visual evaluation showed that the samples containing pectin developed less haze and sedimentation with increasing level of added pectin. The results are summarized below.

| Hunter Readings | Control 1 | Control 2 | 140 PPM Pectin | |
|---|---|---|---|---|
| | | | Pectin 1 | Pectin 2 |
| L | 34.27 | 37.79 | 20.99 | 20.76 |
| a | 19.77 | 19.69 | 20.68 | 20.58 |
| b | 22.66 | 22.99 | 14.36 | 14.23 |
| Haze | 51.18 | 49.98 | 44.41 | 45.67 |

| | 180 ppm Pectin | | 280 ppm Pectin | |
|---|---|---|---|---|
| | Pectin 1 | Pectin 2 | Pectin 1 | Pectin 2 |
| L | 29.05 | 20.70 | 22.54 | 22.59 |
| a | 20.98 | 20.81 | 22.07 | 22.13 |
| b | 14.37 | 14.20 | 15.43 | 15.45 |
| Haze | 41.59 | 40.94 | 28.95 | 28.80 |

All of the samples contained some sediment. However, visually there appeared to be decreasing amounts of sediment with increasing pectin levels. The Hunter data also shows that pectin JMJ can reduce the rate at which haze develops and that the rate is a function of pectin concentration. The higher L value of the control is a result of the significant tea pigment sedimentation resulting in a lighter colored solution.

EXAMPLE 4

Four tea solutions were prepared using a Cecilware Tea brewing system with a 5 gallon yield. Two preparations were made without added pectin as a control and two with addition of JMJ pectin to result in a pectin concentration in the final beverage of 150 ppm. The samples were prepared alternatively with and without pectin to assure randomness. The tea used for these trials was not a low creaming blend of tea. The brewing of tea in the Cecilware unit involves extraction of the tea with hot water 180–190° F. in a fixed or static bed contained in a filter paper lined basket followed by dilution with cold water. The final beverage concentration of tea solids will be on the order of 0.25–0.30%. The pectin was introduced onto the tea in the basket of the brewer as a hydrated solution to insure complete extraction into the tea beverage with hot water. Haze readings were taken with a Hunter Colorimeter as a function of time for each sample from time zero to approximately two hours after brewing.

Results:

The data is presented below in the tables and has been presented graphically in the Figure. This experiment was conducted to evaluate the effectiveness of citrus pectin alone for preventing development of turbidity and sedimentation in fresh tea decoction as claimed by the Japanese in patent application No. 61-68186. The data shows that pectin JMJ slows the onset of haze/cream formation when added to the brewed tea at 150 ppm. However, the tea brews produced clearly developed cream and haze within several hours of preparation even with the addition of citrus pectin.

R1 & R3: SAMPLES WITHOUT PECTIN
R2 & R4: SAMPLES WITH 0.15% PECTIN ADDED

| | HAZE |
|---|---|
| RUN 1 | |
| TIME 0 | 20.05 |
| TIME 27 | 29.79 |
| TIME 69 | 52.34 |
| TIME 89 | 57.96 |
| TIME 109 | 61.33 |
| TIME 130 | 64.08 |
| RUN 2 | |
| TIME 0 | 18.36 |
| TIME 26 | 21.89 |
| TIME 58 | 33.99 |
| TIME 78 | 43.95 |
| TIME 98 | 51.00 |
| TIME 117 | 55.97 |
| RUN 3 | |
| TIME 0 | 16.87 |
| TIME 36 | 30.25 |
| TIME 56 | 43.69 |
| TIME 76 | 53.28 |
| TIME 97 | 59.59 |
| TIME 116 | 62.63 |
| RUN 4 | |
| TIME 0 | 15.97 |
| TIME 31 | 19.46 |
| TIME 51 | 28.38 |
| TIME 66 | 39.97 |
| TIME 92 | 49.52 |
| TIME 111 | 54.84 |

The times above are expressed in minutes of storage.

EXAMPLE 5

Nine tea solutions with varying tea solids, extraction temperatures and amounts of pectin addition were prepared to investigate the effect of pectin on ready to drink tea. Kettle extractions were used to produce the tea extract. All extraction conditions were the same for each experiment as follows:

| Water:leaf | 10:1 |
|---|---|
| Water wt. | 200 lbs. |
| Leaf Wt. | 20 lbs. |
| Leaf Blend | Sample low creaming black tea |
| Extraction Time | 10 min. |

Once the extraction is complete the leaf was removed from the liquor. The product extract was then polished as close to the extraction temperature as possible.

| | Extraction Temp. | Polisher Temp. |
|---|---|---|
| RUN 1 | 212° F. | 170° F. |
| RUN 2 | 194° F. | 170° F. |
| RUN 3 | 150° F. | 150° F. |
| RUNE 4 | 90° F. | 90° F. |

The finished product is then heat treated at 218° F. for 9 sec to achieve biological stability and cooled to 70° F.

The tea solids obtained from the prior extraction and polishing are used to prepare the individual samples A through I. Each sample contained sixty pounds total. This includes high fructose corn syrup with a 55 Brix (HFCS 55), pectin where listed, flavorant, citric acid, water and the listed percentage of tea solids based on the total weight of the sample.

| | % | Weight |
|---|---|---|
| A. 212° F. Extraction | No Pectin | 0.30% Solids |
| Water | | |
| 2.82677 Tea Solids (0.30%) | 0.30 | |
| HFCS 55 | 11.69 | 7.01 lb. |
| Flavorant | .186 | 50.6 g |
| Citric Acid | .192 | 52.25 g |
| | | 60 lb. total |

| | % | Weight |
|---|---|---|
| B. 212° F. Extraction | 220 ppm Pectin | .30% Solids |
| Water | | |
| 2.82677 tea solids | 0.30 | |
| HFCS 55 | 11.69 | 7.01 lb. |
| Pectin | .02 | 5.44 g |
| Flavorant | .186 | 50.6 g |
| Citric Acid | .192 | 52.25 g |
| | | 60 lb. total |

| | % | Weight |
|---|---|---|
| C. 212° F. Extraction | No Pectin | 0.12% Solids |
| Water | | |
| 2.82677 tea solids | 0.12 | |
| HFCS 55 | 11.69 | 7.01 lb. |
| Flavorant | .186 | 50.6 g |
| Citric Acid | .192 | 52.25 g |
| | | 60 lb. total |

| | % | Weight |
|---|---|---|
| D. 212° F. Extraction | 200 ppm Pectin | .12% Solids |
| Water | | |
| 2.82677 tea solids | .12 | |
| HFCS 55 | 11.69 | 7.01 lb. |
| Pectin | .02 | 5.44 g |
| Flavorant | .186 | 50.6 g |
| Citric Acid | .192 | 52.25 g |
| | | 60 lb. total |

| | % | Weight |
|---|---|---|
| E. 194° F. Extraction | 200 ppm Pectin | .12% Tea |
| Water | | |
| 2.82677 tea solids | .12% | |
| HFCS 55 | 11.69 | 7.01 lb. |
| Pectin | .020 | 5.44 |
| Flavorant | .186 | 50.6 g |
| Citric Acid | .192 | 52.25 g |
| | | 60 lb. total |

| | % | Weight |
|---|---|---|
| F. 150° Extraction | No Pectin | .30% Tea |
| Water | | |
| 2.82677 Tea Solids | .30 | |
| HFCS 55 | 11.69 | 7.01 lb. |
| Flavorant | .186 | 50.6 g |
| Citric Acid | .192 | 52.25 g |
| | | 60 lb. total |

| | % | Weight |
|---|---|---|
| G. 150° Extraction | 200 ppm Pectin | .30% Tea |
| Water | | |
| 2.82677 Tea Solids | .3 | |
| Pectin | .020 | 5.44 g |
| HFCS 55 | 11.69 | 7.01 lb. |
| Flavorant | .186 | 50.6 g |
| Citric Acid | .192 | 52.25 g |
| | | 60 lb. total |

| | % | Weight |
|---|---|---|
| H. 90° Extraction | No Pectin | .12% Tea |
| Water | | |
| 2.82677 Tea Solids | .12 | |
| HFCS 55 | 11.69 | 7.01 lb. |
| Flavorant | .186 | 50.6 g |
| Citric Acid | .192 | 52.25 g |
| | | 60 lb. total |

| | % | Weight |
|---|---|---|
| I. 90° Extraction | 200 ppm Pectin | .12% Tea |
| Water | | |
| 2.82677 Tea Solids (.12%) | .12 | |
| Pectin | .020 | 5.44 g |
| HFCS 55 | 11.69 | 7.01 lb. |
| Flavorant | .186 | 50.6 g |
| Citric Acid | .192 | 52.25 g |
| | | 60 lb. total |

Haze results were measured with a Hunter Lab DD-9000 Haze Measuring machine at varied times. The haze results after 2, 7, 14, 21 and 28 days are reported in the table below:

TABLE

HAZE VALUES

| | A | B | C | D | E | H | I | F | G |
|---|---|---|---|---|---|---|---|---|---|
| Ext. Temp. | 212 | 212 | 212 | 212 | 194 | 90 | 90 | 150 | 150 |
| Pectin ppm | 0 | 200 | 0 | 200 | 200 | 0 | 200 | 0 | 200 |
| Tea Solids | 0.3 | 0.3 | 0.12 | 0.12 | 0.12 | 0.12 | 0.12 | 0.3 | 0.3 |
| Time (days) | Haze | Haze | Haze | Haze | Haze | Haze | Haze | Haze | Haze |
| 2 | 37.00 | 29.84 | 19.24 | 17.49 | 13.50 | 7.64 | 7.80 | 24.80 | 17.10 |
|   | 37.11 | 29.83 | 19.59 | 18.11 | 13.48 | 7.63 | 7.91 | 25.20 | 17.51 |
| Avg. | 37.06 | 29.84 | 19.42 | 17.80 | 13.49 | 7.64 | 7.86 | 25.00 | 17.31 |
| 7 | 61.86 | 35.38 | 26.55 | 21.13 | 13.52 | 7.57 | 8.46 | 34.23 | 21.18 |
|   | 51.91 | 35.45 | 26.71 | 20.90 | 13.42 | 7.75 | 8.45 | 34.87 | 21.65 |
| Avg. | 51.89 | 35.42 | 26.63 | 21.02 | 13.47 | 7.66 | 8.46 | 34.55 | 21.42 |
| 14 | 68.24 | 40.22 | 30.67 | 22.50 | 17.48 | 11.54 | 9.48 | 45.63 | 27.28 |
|   | 67.77 | 40.44 | 31.55 | 22.72 | 17.80 | 11.52 | 9.60 | 46.99 | 26.90 |
| Avg. | 68.01 | 40.33 | 31.11 | 22.61 | 17.64 | 11.53 | 9.54 | 46.31 | 27.09 |
| 21 | 73.74 | 42.37 | 37.36 | 21.92 | 20.14 | 12.94 | 10.33 | 59.45 | 28.96 |
|   | 74.92 | 43.88 | 38.28 | 23.19 | 20.81 | 13.83 | 10.52 | 60.33 | 29.37 |
|   | 75.25 | 45.24 | 37.27 | 24.03 | 20.00 | 14.15 | 11.11 | 60.90 | 29.80 |
|   | 76.82 | 45.47 | 37.71 | 24.69 | 20.04 | 14.08 | 11.21 | 60.98 | 30.49 |
| Avg. | 75.18 | 44.24 | 37.66 | 23.46 | 20.25 | 13.75 | 10.79 | 60.42 | 29.66 |
| 28 | 79.19 | 50.23 | 40.54 | 24.72 | 21.07 | 16.02 | 11.40 | 65.17 | 32.39 |
|   | 81.82 | 50.26 | 40.74 | 25.72 | 21.86 | 16.08 | 11.43 | 66.75 | 32.40 |
|   | 80.93 | 49.12 | 41.80 | 25.23 | 20.65 | 14.03 | 11.69 | 67.08 | 33.58 |
|   | 81.43 | 49.67 | 42.51 | 25.63 | 20.67 | 14.52 | 12.93 | 68.83 | 34.42 |
| Avg. | 80.84 | 49.82 | 41.40 | 25.33 | 21.06 | 15.16 | 11.86 | 66.96 | 33.20 |

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A process for preparing stabilized acidified liquid tea products comprising:

a) substantially dissolving in water to form a tea solution, a concentrated powdered tea product at a level of about 0.3% tea solids or less, said powdered tea product being obtained by extraction from tea solids, said solids being selected for their low cream value, at a temperature of about 60° F. to 180° F. at a water to leaf ratio of about 4:1 to 30:1 to form tea extract and by reducing the moisture content of said tea extract to a level not exceeding about five percent by weight on said tea solids basis to form a tea solution;

b) acidifying said tea solution to a pH of about 4.5 or less, if said tea solution is not already at said pH and;

adding a sufficient amount of a high methoxy pectin to said acidified tea product to result in a total amount of said pectin in said acidified tea product of about 50 to about 500 parts per million (ppm).

2. A tea product prepared by the process of claim 1 wherein said pectin is derived solely from citrus.

3. A tea product prepared by the process of claim 1 wherein said pectin is derived from tea.

4. A tea product prepared by the process of claim 1 wherein said concentrated powdered tea product is made from tea solids which are obtained from a black tea selected for its low cream index.

5. A process as defined in claim 1 wherein said powdered tea product is obtained by spray drying.

6. A process as defined in claim 1 wherein said powdered tea product is obtained by freeze drying.

7. A process as defined in claim 1 wherein said pH is about 2.8 to 3.2.

8. A process for preparing an acidified final liquid tea product stabilized from development of haze and sedimentation upon storage and having superior flavor comprising performing, in any order, the steps of:

a) extracting tea leaves with water at a temperature of less than about 180° F. and a water to leaf ratio of about 4:1 to 30:1 to prepare a fresh brewed tea extract infusion free of insoluble materials, then adjusting the brewed tea solids of said infusion, if necessary, to a level of 0.3% by weight or less of said solids to form a tea product;

b) adding a sufficient amount of high methoxy pectin to said tea product to result in a total amount of said pectin of about 50 to 500 parts per million (ppm) in said tea product;

c) adjusting the pH of said tea product, if necessary, to a pH of about 4.5 or less to form said acidified final liquid tea product.

9. A tea product prepared by the process of claim 8 wherein said pectin is derived solely from citrus.

10. A tea product prepared by the process of claim 8 wherein said pectin is derived solely from tea leaves.

11. A tea product prepared by the process of claim 8 wherein said tea extract is concentrated or made into a powder by drying before being used to prepare said product.

12. A process as defined in claim 8 wherein said powdered tea product is obtained by spray drying.

13. A process as defined in claim 8 wherein said powdered tea product is obtained by freeze drying.

14. A process as defined in claim 8 wherein the pH of said product is about pH 2.8 to 3.2.

15. A process as defined in claim 8 wherein the tea extract is rendered cold water soluble by treatment with chemicals or enzymes.

16. A process as defined in claim 8 wherein said tea is selected from the group consisting of green tea, oolong tea, black tea and mixtures thereof.

17. A process as defined in claim 1 wherein said extraction temperature is about 90° F.

18. A process as defined in claim 8 wherein said extraction temperature is about 90° F.

19. A process as defined in claim 1 wherein the tea extract is rendered cold water soluble by treatment with chemicals or enzymes.

* * * * *